United States Patent
Burkey (10) Patent No.: US 7,941,602 B2
(45) Date of Patent: May 10, 2011

(54) METHOD, APPARATUS AND PROGRAM STORAGE DEVICE FOR PROVIDING GEOGRAPHICALLY ISOLATED FAILOVER USING INSTANT RAID SWAPPING IN MIRRORED VIRTUAL DISKS

(75) Inventor: Todd R. Burkey, Savage, MN (US)

(73) Assignee: Xiotech Corporation, Eden Prairie, MN (US)

( * ) Notice: Subject to any disclaimer, the term of this patent is extended or adjusted under 35 U.S.C. 154(b) by 42 days.

(21) Appl. No.: 11/055,756

(22) Filed: Feb. 10, 2005

(65) Prior Publication Data

US 2006/0179218 A1    Aug. 10, 2006

(51) Int. Cl.
*G06F 12/08*    (2006.01)
*G06F 12/00*    (2006.01)

(52) U.S. Cl. ........ 711/114; 711/111; 711/112; 711/154; 711/161; 711/162; 711/170; 711/202; 711/203

(58) Field of Classification Search .......... 711/111–112, 711/114, 154, 161–162, 170, 202–203; 714/5–6
See application file for complete search history.

(56) References Cited

U.S. PATENT DOCUMENTS

| | | | |
|---|---|---|---|
| 5,276,877 A | | 1/1994 | Friedrich et al. |
| 5,392,244 A | * | 2/1995 | Jacobson et al. ............. 711/114 |
| 5,479,653 A | | 12/1995 | Jones |
| 5,742,792 A | * | 4/1998 | Yanai et al. .................. 711/162 |
| 5,819,310 A | | 10/1998 | Vishlitzky et al. |
| 5,870,537 A | * | 2/1999 | Kern et al. ......................... 714/6 |
| 5,875,456 A | | 2/1999 | Stallmo et al. |
| 5,897,661 A | | 4/1999 | Baranovsky |
| 5,961,652 A | * | 10/1999 | Thompson ........................ 714/6 |
| 6,035,306 A | | 3/2000 | Lowenthal et al. |
| 6,237,063 B1 | * | 5/2001 | Bachmat et al. .............. 711/114 |
| 6,275,898 B1 | | 8/2001 | DeKoning |
| 6,282,619 B1 | * | 8/2001 | Islam et al. .................... 711/165 |
| 6,341,333 B1 | * | 1/2002 | Schreiber et al. ............. 711/114 |
| 6,401,215 B1 | * | 6/2002 | Maddalozzo et al. ........... 714/6 |
| 6,487,562 B1 | | 11/2002 | Mason, Jr. et al. |
| 6,510,491 B1 | * | 1/2003 | Franklin et al. ............... 711/114 |
| 6,516,425 B1 | | 2/2003 | Belhadj et al. |
| 6,530,035 B1 | | 3/2003 | Bridge |
| 6,546,457 B1 | | 4/2003 | Don et al. |
| 6,571,314 B1 | | 5/2003 | Komachiya et al. |
| 6,578,158 B1 | | 6/2003 | Deitz et al. |
| 6,629,202 B1 | | 9/2003 | Cabrera et al. |
| 6,633,955 B1 | * | 10/2003 | Yin et al. ....................... 711/114 |
| 6,711,649 B1 | | 3/2004 | Bachmat et al. |
| 6,715,054 B2 | | 3/2004 | Yamamoto |
| 6,728,905 B1 | * | 4/2004 | Gnanasivam et al. .......... 714/43 |
| 6,745,207 B2 | | 6/2004 | Reuter et al. |
| 6,766,416 B2 | | 7/2004 | Bachmat |

(Continued)

OTHER PUBLICATIONS

Tanenbaum, Andrew S., "Structured Computer Organization", 1984, Prentice-Hall, Inc., 2nd Edition, pp. 10-12.*

(Continued)

*Primary Examiner* — Sanjiv Shah
*Assistant Examiner* — Apran P. Savla
(74) *Attorney, Agent, or Firm* — Beck & Tysver PLLC (57) ABSTRACT

A method, apparatus and program storage device for providing geographically isolated failover using instant RAID swapping in mirrored virtual disks are disclosed. The closed loop control mechanism provides not only continuous self-tuning to the storage system, but also allows the system to perform the initial configuration better.

42 Claims, 5 Drawing Sheets

U.S. PATENT DOCUMENTS

| | | | |
|---|---|---|---|
| 6,810,491 B1* | 10/2004 | Yamagami et al. | 714/7 |
| 6,880,052 B2 | 4/2005 | Lubbers et al. | |
| 6,895,485 B1 | 5/2005 | DeKoning et al. | |
| 6,993,635 B1 | 1/2006 | Gazit et al. | |
| 7,062,624 B2 | 6/2006 | Kano | |
| 7,080,196 B1 | 7/2006 | Kitamura | |
| 7,185,144 B2 | 2/2007 | Corbett et al. | |
| 2002/0133539 A1 | 9/2002 | Monday | |
| 2003/0023811 A1 | 1/2003 | Kim et al. | |
| 2003/0061491 A1 | 3/2003 | Jaskiewicz et al. | |
| 2003/0115218 A1 | 6/2003 | Bobbitt et al. | |
| 2003/0204700 A1 | 10/2003 | Biessener et al. | |
| 2003/0204772 A1* | 10/2003 | Petersen et al. | 714/6 |
| 2003/0204773 A1* | 10/2003 | Petersen et al. | 714/6 |
| 2004/0037120 A1 | 2/2004 | Uysal et al. | |
| 2006/0069862 A1 | 3/2006 | Kano | |

OTHER PUBLICATIONS

Rogers et al., "z/OS Version 1 Release 3 and 4 Implementation", Jun. 2003, IBM, SG24-6581-00, ISBN 0738425680. Retrieved Feb. 23, 2009 from <http://www.redbooks.ibm.com/redbooks/pdfs/sg246581.pdf>.*

White et al., "IBM eServer zSeries 990 Technical Guide", May 2004, IBM, SG24-6947-01, ISBN 0738497657. Retrieved Feb. 23, 2009 from <http://www.redbooks.ibm.com/redbooks/pdfs/sg246947.pdf>.*

"Disk Thrashing" Jul. 3, 2003. Retrieved from http://www.webopedia.com/TERM/d/disk_thrashing.htm.

Office Action, mailed May 5, 2004, U.S. Appl. No. 10/183,979.
Office Action, mailed Feb. 10, 2005, U.S. Appl. No. 10/183,946.
Office Action, mailed Feb. 24, 2005, U.S. Appl. No. 10/390,022.
Office Action, mailed Jun. 27, 2005, U.S. Appl. No. 10/184,059.
Office Action, mailed Jul. 1, 2005, U.S. Appl. No. 10/184,058.
Office Action, mailed Sep. 12, 2005, U.S. Appl. No. 10/445,811.
Office Action, mailed Sep. 14, 2005, U.S. Appl. No. 10/390,022.
Office Action, mailed Oct. 20, 2005, U.S. Appl. No. 10/629,415.
Office Action, mailed Dec. 29, 2005, U.S. Appl. No. 10/184,058.
Office Action, mailed Apr. 10, 2006, U.S. Appl. No. 10/445,811.
Office Action, mailed May 1, 2006, U.S. Appl. No. 10/390,022.
Office Action, mailed Jun. 1, 2006, U.S. Appl. No. 10/629,415.
Office Action, mailed Aug. 22, 2006, U.S. Appl. No. 10/781,594.
Office Action, mailed Feb. 6, 2007, U.S. Appl. No. 11/037,404.
Office Action, mailed Feb. 8, 2007, U.S. Appl. No. 11/037,317.
Office Action, mailed May 15, 2007, U.S. Appl. No. 10/629,415.
Office Action, mailed Jun. 19, 2007, U.S. Appl. No. 11/086,079.
Office Action, mailed Jul. 27, 2007, U.S. Appl. No. 10/390,022.
Office Action, mailed Sep. 10, 2007, U.S. Appl. No. 10/629,415.
Office Action, mailed Sep. 20, 2007, U.S. Appl. No. 10/390,022.
Office Action, mailed Sep. 20, 2007, U.S. Appl. No. 11/037,317.
Office Action, mailed Feb. 11, 2008, U.S. Appl. No. 11/037,404.
Office Action, mailed Mar. 18, 2008, U.S. Appl. No. 11/037,317.
Office Action, mailed Apr. 4, 2008, U.S. Appl. No. 11/086,079.
Office Action, mailed Jun. 16, 2008, U.S. Appl. No. 11/229,964.
Office Action, mailed Aug. 18, 2008, U.S. Appl. No. 11/037,317.
Office Action, mailed Dec. 9, 2008, U.S. Appl. No. 11/037,404.
Office Action, mailed Dec. 10, 2008, U.S. Appl. No. 10/629,415.
Office Action, mailed Dec. 12, 2008, U.S. Appl. No. 11/037,317.
Office Action, mailed Jan. 5, 2007, U.S. Appl. No. 10/865,339.
Office Action, mailed Feb. 3, 2009, U.S. Appl. No. 11/086,079.
Office Action, mailed Aug. 4, 2009, U.S. Appl. No. 10/629,415.
Office Action, mailed Aug. 18, 2007, U.S. Appl. No. 11/241,176.
Office Action, mailed Apr. 27, 2010, U.S. Appl. No. 11/086,079.
Office Action, mailed Apr. 28, 2010, U.S. Appl. No. 11/731,700.
Office Action, mailed May 21, 2010, U.S. Appl. No. 10/629,415.
Office Action, mailed Jun. 1, 2010, U.S. Appl. No. 11/037,404.
Office Action, mailed Nov. 10, 2010, U.S. Appl. No. 12/150,653.

* cited by examiner

METHOD, APPARATUS AND PROGRAM STORAGE DEVICE FOR PROVIDING GEOGRAPHICALLY ISOLATED FAILOVER USING INSTANT RAID SWAPPING IN MIRRORED VIRTUAL DISKS

BACKGROUND OF THE INVENTION

1. Field of the Invention

This invention relates in general to storage systems, and more particularly to a method, apparatus and program storage device for providing geographically isolated server failover between mirrored virtual disks using an instant RAID swapping technique.

2. Description of Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. The interconnection of the various points on the computer network may be accomplished using a variety of known topologies. Generally, a host computer (e.g., server) may function as a centralized point on the network. For example, using any of the network topologies discussed above, a plurality of client computers may be interconnected such that the server controls the movement of data across the network. The host computer may have an operating system that may be used to execute a server application program that is adapted to support multiple clients. Typically, the server may service requests from a plurality of client computers that are connected to the network. Furthermore, the server may be used to administer the network. For example, the server may be used to update user profiles, establish user permissions, and allocate space on the server for a plurality of clients connected to the network.

In many computer networks, a large amount of data may be stored on the server and accessed by the attached client computers. For example, each client computer may be assigned a variable amount of storage space on a server. The administration of a storage system is often a complex task that requires a great deal of software and hardware knowledge on the part of the administrator. Given a pool of storage resources and a workload, an administrator must determine how to automatically choose storage devices, determine the appropriate device configurations, and assign the workload to the configured storage. These tasks are challenging, because the large number of design choices may interact with each other in poorly understood ways.

The explosion of data being used by businesses is making storage a strategic investment priority for companies of all sizes. As storage takes precedence, concern for business continuity and business efficiency has developed. Two new trends in storage are helping to drive new investments. First, companies are searching for more ways to efficiently manage expanding volumes of data and make that data accessible throughout the enterprise. This is propelling the move of storage into the network. Second, the increasing complexity of managing large numbers of storage devices and vast amounts of data is driving greater business value into software and services. A Storage Area Network (SAN) is a high-speed network that allows the establishment of direct connections between storage devices and processors (servers) within the distance supported by Fibre Channel. SANs are the leading storage infrastructure for the world of e-business. SANs offer simplified storage management, scalability, flexibility, availability, and improved data access, movement, and backup.

It is common in many contemporary storage networks to require continuous access to stored information. The conventional method of taking data storage systems offline to update and backup information is not possible in continuous access storage networks. However, system reliability demands the backup of crucial data and fast access to the data copies in order to recover quickly from human errors, power failures, hardware failure and software defects. In order to recover from geospecific disasters, it is common to share data among geographically dispersed data centers.

One method to meet data backup and sharing needs uses data replication in which a second copy or "mirror" of information located at a primary site is maintained at a secondary site. This mirror is often called a "remote mirror" if the secondary site is located away from the primary site. When changes are made to the primary data, updates are also made to the secondary data so that the primary data and the secondary data remain "synchronized", preventing data loss if the primary site goes down. For even more security, multiple copies of the data may be made at the secondary or even tertiary sites.

A virtual disk drive is a set of disk blocks presented to an operating environment as a range of consecutively numbered logical blocks with disk-like storage and I/O semantics. The virtual disk is the disk array object that most closely resembles a physical disk from the operating environment's viewpoint. In a storage network implementing virtual disks, a source virtual disk may be copied to another (destination) virtual disk at an extremely high rate. While data is being copied to the destination virtual disk, the source drive remains online and accessible, responding to all I/O requests, continually mirroring write requests to the destination virtual disk as well. When the copy operation completes, a mirrored virtual disk set exists, which includes the source and the destination virtual disk. The destination virtual disk continues to mirror the source virtual disk until the connection between the two is broken.

In contemporary raid storage arrays that support block level mirroring of virtual disks, any catastrophic failure of the raid arrays that are the destination of mirrors will typically not affect continuous data access to the primary virtual disks in any way, since they are essentially considered backups and are never read from. Failure of the primary raid array is a totally different matter and will generally require intervention in some form or another to allow servers to continue to access their 'backup' storage. Typically this is neither seamless or inexpensive as it is very server specific and will involve significant up front server costs in terms of server failover software, redundant servers, and risky to use and often error prone due to custom approaches that attempt to cover the typical types of failures and fail miserably to accommodate the unexpected types of failures. These approaches also tend to have extremely long recovery (rebuild) times and extensive periods of time where systems run at much reduced redundancy levels.

The need exists to mirror virtual disks in such a way that within a single storage system that is geographically dispersed (i.e. controllers and drive bays separated within a building or between buildings), mission critical virtual disk access continues even through the loss of ANY one location of storage (i.e. including the primary location). The need also exists to improve performance of mirrored partners during failed disk rebuilds and reduce the recovery times of temporary loss to major portions of the physical storage (communications breaks between buildings). Luckily these needs can be addressed in virtualized storage arrays that allow for the concepts of instantly swapping 'mirrored' raid arrays from within their data structures.

It can be seen then that there is a need for a method, apparatus and program storage device for providing geographically isolated failover using instant RAID swapping in mirrored virtual disks.

SUMMARY OF THE INVENTION

To overcome the limitations in the prior art described above, and to overcome other limitations that will become apparent upon reading and understanding the present specification, the present invention discloses a method, apparatus and program storage device for providing geographically isolated failover using instant RAID swapping in mirrored virtual disks.

The present invention solves the above-described problems by instantly switching RAIDs back and forth between synchronously mirrored virtual disks to always ensure that the source VDisk in a mirror set contains RAIDs that are fully operational if at all possible A method for implementing the present invention includes providing a first virtual disk comprising a first physical disk set configured in a first RAID configuration, providing a second virtual disk that the first virtual disk is synchronously mirrored to, the second virtual disk comprising a second physical disk set configured in a second RAID configuration, detecting failure of at least one physical disk of the first set of physical disks and performing an instant swap of the raids that are contained within each vdisk (i.e. the source virtual disk will now think its raid arrays are the second raid configuration and the destination virtual disk will now think that its raid arrays are the first raid configuration.) From this point forwards, any further failure of physical disks in the first raid configuration (i.e. the single disk failure turns out to be a catastrophic failure of the entire first raid array) will have no impact on the source virtual disk, other than the mirror will break at that point (or go into an offline state until the raid array is recovered and delta changes can be resynchronized back.).

In another embodiment of the present invention, a storage system is provided. The storage system includes a first set of physical disk set configured in a first RAID configuration, a second set of physical disk set configured in a second RAID configuration and a controller for creating a first virtual disk comprising the first physical disk set configured in the first RAID configuration and for creating a second virtual disk mirroring the first virtual disk, wherein the second virtual disk comprises the second physical disk set configured in the second RAID configuration, wherein the controller detects failure of at least one physical disk of the first set of physical disks and performs an instant swap of the mirrored second physical set of disks configured in the second RAID configuration to the first virtual disk.

In another embodiment of the present invention, a program storage device, including program instructions executable by a processing device to perform operations for providing management and control for a storage system is provided. The operations include providing a first virtual disk comprising a first physical disk set configured in a first RAID configuration, providing a second virtual disk mirroring the first virtual disk, the second virtual disk comprising a second physical disk set configured in s second RAID configuration, detecting failure of at least one physical disk of the first set of physical disks and performing an instant swap of the mirrored second physical set of disks configured in the second RAID configuration to the first virtual disk.

In another embodiment of the present invention, another storage system is provided. This storage system includes a first set of physical storage configured in a first RAID configuration, a second set of physical storage configured in a second RAID configuration and the means for creating a first virtual disk comprising the first physical storage configured in the first RAID configuration and for creating a second virtual disk mirroring the first virtual disk, wherein the second virtual disk comprises the second physical storage configured in the second RAID configuration, wherein the means for detecting failure of at least one physical disk of the first set of physical storage and performing an instant swap of the mirrored second physical storage configured in the second RAID configuration to the first virtual disk.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides method, apparatus and program storage device for providing geographically isolated failover using instant RAID swapping in mirrored virtual disks. The present invention instantly switches RAIDs back and forth between synchronously mirrored virtual disks to always ensure that the source VDisk in a mirror set contains RAIDs that are fully redundant.

Figure 1:
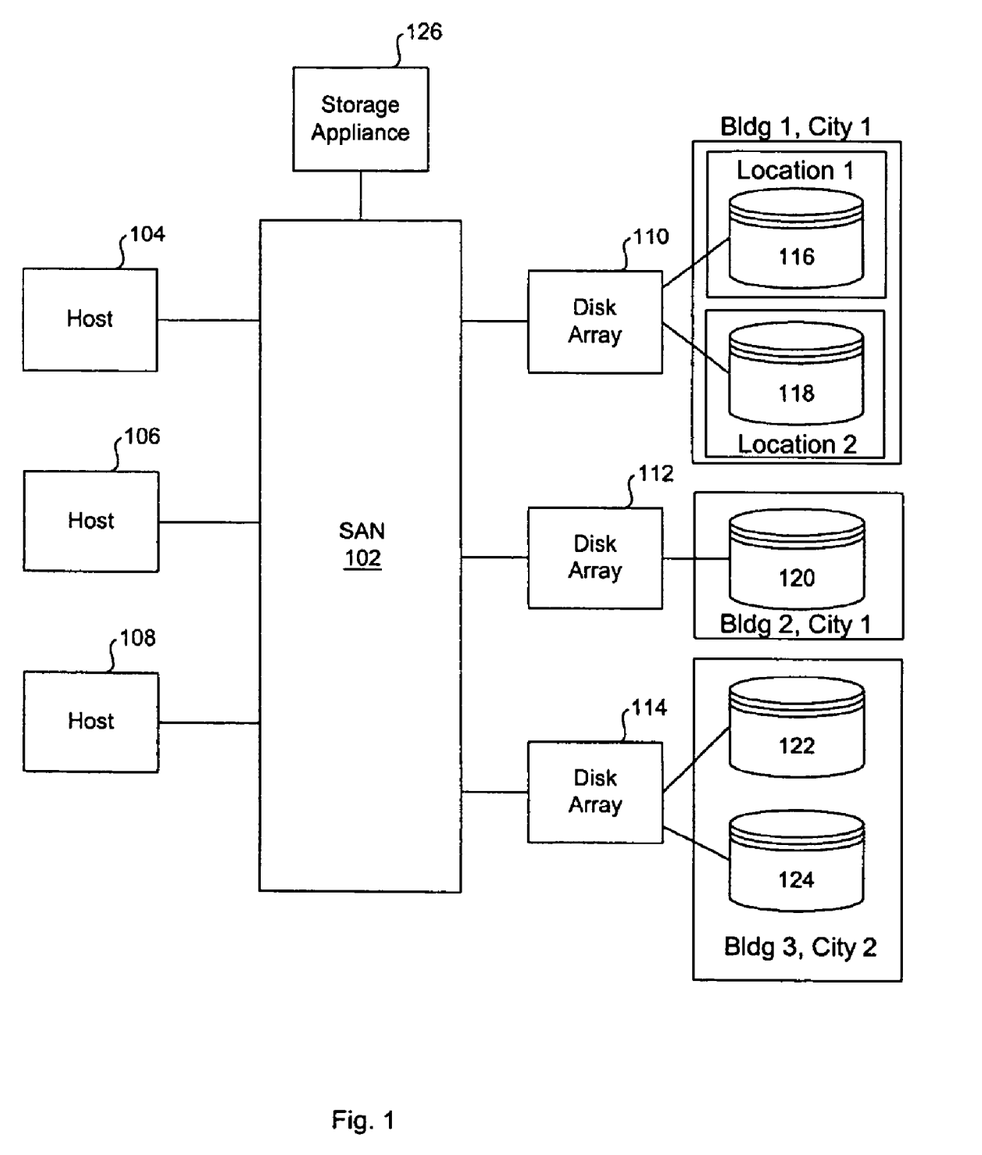
FIG. 1 illustrates a storage system.

FIG. 1 illustrates a storage system 100. In FIG. 1, a storage area network 102 provides a set of hosts (e.g., servers or workstations) 104, 106, 108 that may be coupled to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further correspond to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

Moreover, virtual disks may be mirrored in such a way that within a single storage system 100 having physical disks 116-124 that are separated into geographically dispersed regions, i.e. controllers and drive bays separated within a building (Location 1 and Location 2), between buildings (Bldg. 1 and Bldg. 2) or between cities (City 1 and City 2). In this manner, mission critical virtual disk access continues even through the loss of one location of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization converts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

One early technique, Redundant Array of Independent Disks (RAID), provides some limited features of virtualization. Various RAID subtypes have been implemented. In RAID1, a virtual disk may correspond to two physical disks 116, 118 which both store the same data (or otherwise support recovery of the same data), thereby enabling redundancy to be supported within a storage area network. In RAID0, a single virtual disk is striped across multiple physical disks. Some other types of virtualization include concatenation, sparing, etc. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in a storage appliance 126 separate from the hosts and storage pool. Unfortunately, each of these implementation schemes has undesirable performance limitations.

Virtualization in the storage array involves the creation of virtual volumes over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

The simplest guard against failure is replication. By replicating a system component, a spare is ready to take over if the primary should fail. Replication can occur at many levels, according to the faults it guards against. Replicating disks, through widespread strategies such as RAID, protects against the failure of a single disk. Many vendors offer disk replication solutions that are efficient and easy to manage. With disk replication, recovery from a disk failure can be fast and invisible to applications. However, disk replication does not account for multiple disk (entire bays of drives) failures, the failure of the host machine, or destruction of the entire site.

Replication of a server machine protects against hardware and software errors on the data server. Disks can be dualported, allowing more than one machine direct access to raw data. Along with disk replication strategies, a replicated server can provide high availability even after single disk and single server failures. Just as with replicated disks, tape backups can guard against data loss in a site-wide failure, but extended downtime will still occur.

Replicating an entire site across user controlled distances, called "geographic replication," increases data availability by accounting for local subsystem level failures as well as sitewide faults, such as extended power outages, fires, earthquakes, or even terrorist attacks. In a geographic replication system, normal system operation occurs at a local site. Data is mirrored to a remote site, which can take over system functions if the local site is lost. Geographic replication does not mirror application address spaces or any other volatile memory; only data written to stable storage devices is transmitted to the remote site. Distributing cluster storage across extended distances is complex and time-consuming; consequently, failover to the remote site cannot be performed as efficiently and invisibly as failover to a secondary server or hot-swapping a new disk into a storage array.

In order to provide continuous access to mission critical data during the loss of one location of storage, a failover mechanism must be implemented to provide accurate instance monitoring or heartbeat mechanisms. In addition, for normal operations, the system must be able to quickly and accurately synchronize resources during failover. The process of synchronizing, or "re-mastering", requires the graceful shutdown of the failing system as well as an accurate assumption of control of the resources that were mastered on that system. Accurate re-mastering also requires that the system have adequate information about resources across the cluster. This means your system must record resource information to remote nodes as well as local. This makes the information needed for failover and recovery available to the recovering instances.

Figure 2:
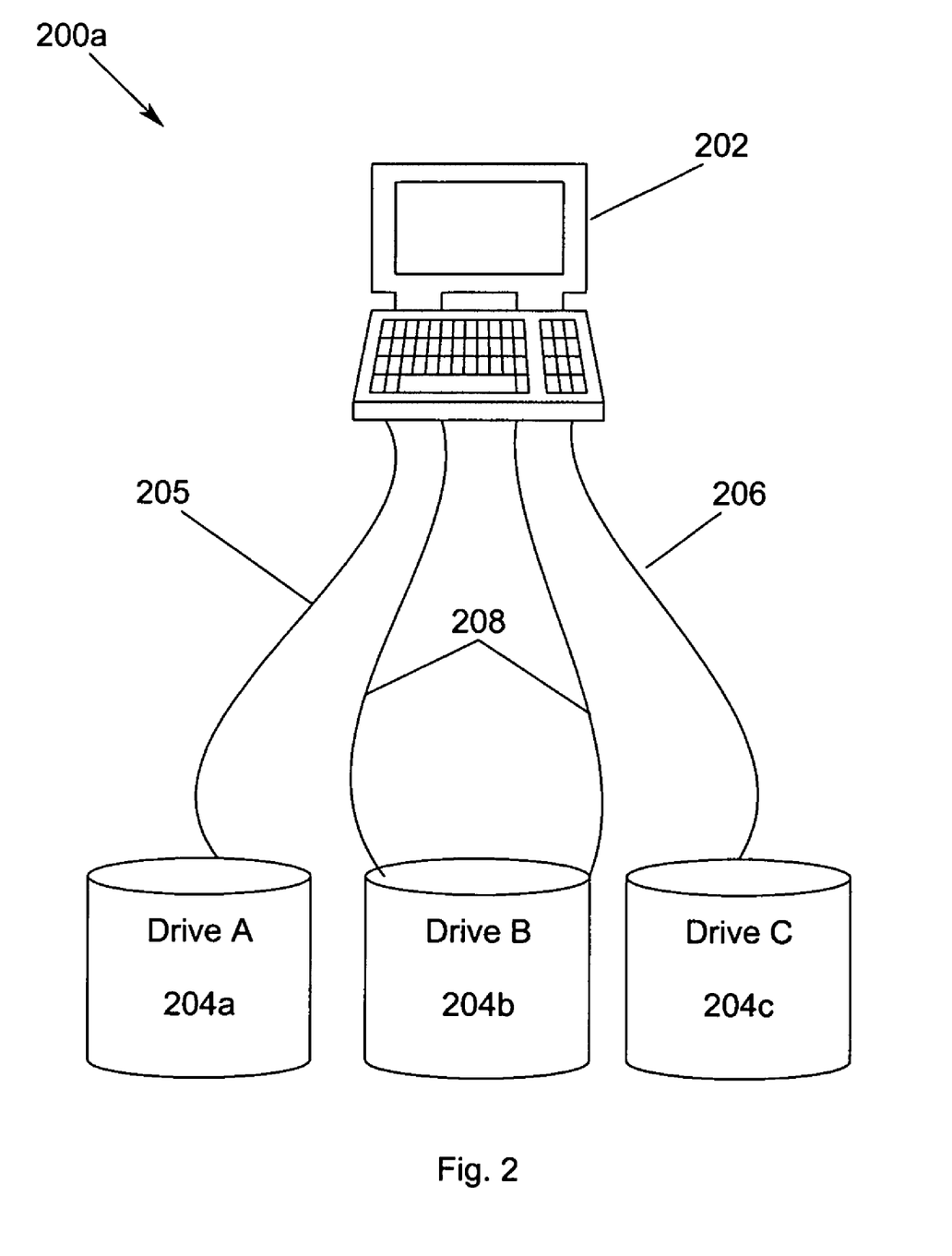
FIG. 2 is an illustration showing a computer storage system providing multipath failover.

Failover mechanisms generally may be classified into host based failover methods and multipath I/O based failover method. FIG. 2 is an illustration showing a computer storage system 200 providing multipath failover. The computer storage system 200 includes a computer system 202 coupled to computer storage devices 204a, 204b, and 204c via data paths 206 and 208. In particular, computer storage devices 204a and 204c are coupled to the computer system 202 via single-path data paths 206, and computer storage device 204b is coupled to the computer system 202 via the multi-path data path 208.

The computer system 202 typically is any computer operated by users, such as PCs, Macintosh, or Sun Workstations. However, it should be borne in mind that the computer system 202 can actually be any type of processor that can be put in communication with the storage devices 204a, 204b, and 204c. The storage devices 204a, 204b, and 204c typically are disk drives, however, the storage devices 204a, 204b, and 204c can be any computer device capable of mass storage, such as a tape drives, CDs, or RAID systems.

The data paths 206 and 208 represent any type of data path capable of coupling the computer system 202 to the computer storage devices 204a, 204b, and 204c, such as a simple transport or computer network system. Often, the data paths 206 and 208 reside in an Arbitrated Loop, however, the data paths can also reside in any storage area network (SAN) capable of providing communication between the computer system 202 and the computer storage devices 204a, 204b, and 204c. Another typical computer network wherein the data paths 206 and 208 can reside is a Fabric/Switched SAN, wherein each data path comprises several nodes, each capable of forwarding data packets to a requested destination.

In use, the computer system 202 transmits data to the storage devices 204a and 204c via the single-path data paths 206. The storage devices 204a and 204c then record the transmitted data on their recording medium using whatever apparatus is appropriate for the particular medium being used. In addition, the computer system 202 transmits data to the storage device 204b using the multi-path data path 208. The multi-path data path 208 comprises two or more single-path data paths, each of which couples the computer system 202 to the storage device 204b.

Figure 3:
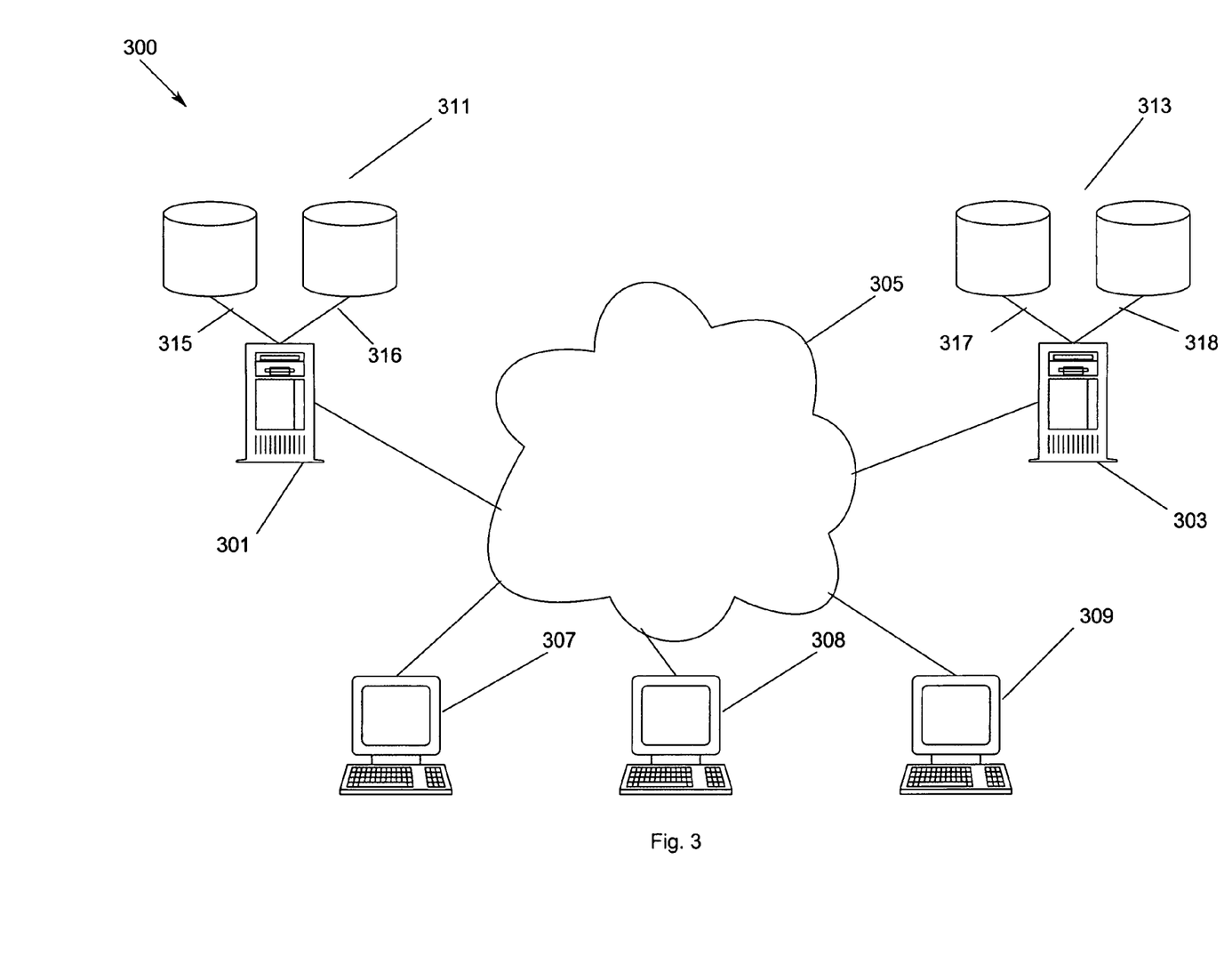
FIG. 3 illustrates a storage system wherein failover is provided through a host based failover method.

FIG. 3 illustrates a storage system 300 wherein failover is provided through a host based failover method. In FIG. 3, the storage system 300 includes a primary server 301 and a secondary server 303 in a fail-over pair arrangement. Primary server 301 is the preferred application server of the pair, and secondary server 303 preferably provides fail-over protection for the primary server. The primary and secondary servers are coupled through a network 305 to a plurality of client computers 307 though 309. The primary and secondary servers 301 and 303 each have access to a respective pair of disk storage devices 311 and 313. Disk storage devices 311 and 313 are connected to servers 301 and 303 through busses 315-316 and 317-318 respectively.

Disk storage devices 311 and 313 may be configured to mirror each other by duplicating all files contained on the other storage device, and a write or update to one storage device updates both devices in the same manner. In the event that either storage device 311, 313 fails, the data contained therein remains available to the system 300 from the operational mirror storage device.

In FIG. 3, application service(s) on a given primary cluster node 301 are monitored. Upon failure of a node 301, services are switched to a secondary cluster node 303 as needed. Host-based failover solutions generally have one active instance performing useful work for a given application. The secondary node 303 monitors the application service on the primary node 301 and initiates failover when service of the primary node 301 is unavailable. Data on the storage devices 311 and 313 may be configured in a RAID configuration. Moreover, those skilled in the art will recognize that the physical storage devices 311 and 313 may be virtualized so that the hosts 307-309 (initiators) see virtual disks as targets.

When a storage system is geographically dispersed (as shown in FIG. 1 for example), data access must be provided so that the loss of one location of storage does not impact data availability. Simply mirroring the data may prevent overall loss, but will not provide failover and mirroring at the server level, which involves excess server overhead and is server specific. Also, very few systems in production today are capable of true geographic separation—at least without using multiple systems. Accordingly, an embodiment of the present invention provides geographically isolated failover using instant RAID swapping in mirrored virtual disks.

Figure 4:
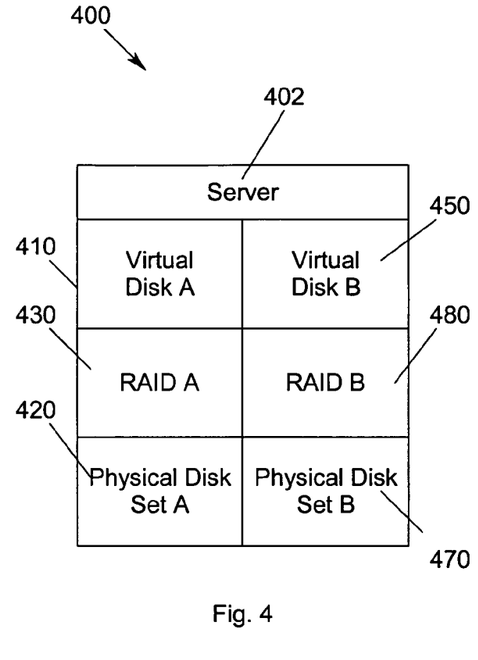
FIG. 4 is a table illustrating the initial configuration of a storage system for providing geographically isolated failover using instant RAID swapping in mirrored virtual disks according to an embodiment of the present invention.

FIG. 4 is a table 400 illustrating the initial configuration of a storage system for providing geographically isolated failover using instant RAID swapping in mirrored virtual disks according to an embodiment of the present invention. In FIG. 4, a server 402 accesses a first virtual disk 410 that includes of one or more raid arrays 430 that are striped over a first physical disk set 420. Thus, the server 402 sends data directly to and reads data directly from the first virtual disk 410. The first virtual disk 410 is mirrored to a second virtual disk 450, which includes one or more raid arrays 480 which uses a second set of physical disks 470.

Figure 5:
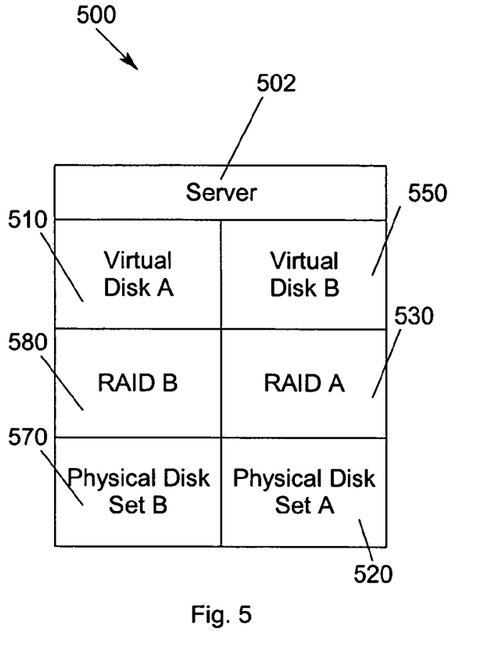
FIG. 5 is a table illustrating the instant swap operation in the mirrored virtual disks to provide geographically isolated failover according to an embodiment of the present invention after a non-catastrophic failure in the primary (source) raid arrays.

FIG. 5 is a table 500 illustrating the instant swap operation in the mirrored virtual disks to provide geographically isolated failover according to an embodiment of the present invention. In FIG. 5, a non-catastrophic (i.e. redundant) failure occurs in one or more of the first set of physical disks 520. To protect against unnecessary server timeouts, an instant swap is performed so that the mirrored second physical set of disks 570 configured in the second RAID configuration 580 are swapped to the first virtual disk 510. The first virtual disk 510 remains mirrored to the second virtual disk 550, which now provides a virtual path to the first set of physical disks 520 having the first RAID configuration 530 for the mirrored data and the second physical set of disks now is used for the direct server read and write operations. In one embodiment of this invention, it may be preferable to wait until there is a catastrophic failure before performing the instant swap operation, but there is likely less risk to server data availability if the operation is performed at the first sign of trouble (i.e. failure of the first redundant physical disk).

Figure 6:
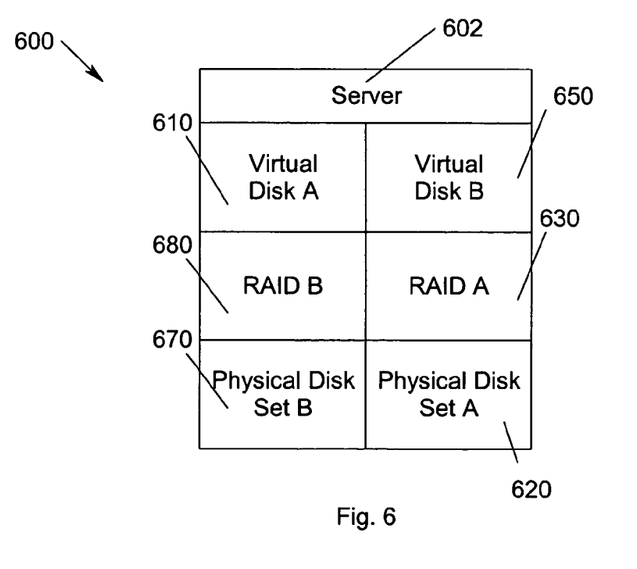
FIG. 6 is a table illustrating the instant swap operation in the mirrored virtual disks to provide geographically isolated failover according to an embodiment of the present invention after a catastrophic failure in the primary (source) raid arrays.

FIG. 6 is a table 600 illustrating the logical layout after a catastrophic failure in the primary set of physical disks. In FIG. 6, a catastrophic failure occurs in the first set of physical disks 620 such that the raid array(s) are totally failed. An instant swap is performed so that the mirrored second physical set of disks 670 configured in the second RAID configuration 680 are swapped to the first virtual disk 610. The first virtual disks' 610 mirror will either be broken or placed into a paused or inactive state (depending on the storage arrays ability to resynchronize after mirror failures.) The second virtual disk 650 will now provide a virtual path to the first set of physical disks 620 having the first RAID configuration 630 for the originally mirrored data and the second physical set of disks 670 now is used for the direct server read and write operations.

According to an embodiment of the present invention, the source and destination virtual disks are allowed to be the same raid type, or different raid types; for example, the source could be raid 5 and the destination raid 10 or raid 0. Conversely the virtual disks can include a different numbers of raid arrays and even consist of virtual links (i.e. rather than point to local storage that is visible by the single distributed storage array, the destination of a mirror could be on another storage system within the same SAN or even on a different storage system on a different SAN). The process provided by a storage system according to an embodiment of the present invention is automatic and minimizes the rebuild and customer downtime, while minimizing the data loss risk as well.

Thus, a storage system configured according to an embodiment of the present invention may take advantage of the ability to instantly switch RAIDs 630, 680 back and forth between synchronously mirrored virtual disks 610, 650 to always ensure that the source virtual disk 610 in a mirror set contains RAIDs that are fully redundant. This means that if the source virtual disk 610 in a mirror set loses redundancy, i.e., one or more of its physical disks fail 620, then the source RAIDs 630 will be swapped with the in-synch RAIDs 680 of the destination, and the source will continue to be fully redundant while the backup (destination) rebuilds. If the destination subsequently becomes inoperative, then the mirror will either break or go into an auto-paused state (if the storage system supports resynchronization) until the drives become operable again. At this point normal resynchronization logic at the virtual level (if it exists) will ensure that the appropriate information is updated. The instant RAID swapping in mirrored virtual disks for providing geographically isolated failover according to an embodiment of the present invention works equally well for single controller, dual controller, or N-way designs where every controller can see common physical drives. A byproduct is also faster response time for access by the server 502 to the source virtual disk 510 during rebuilds, which only will affect the destination virtual disk 550.

Figure 7:
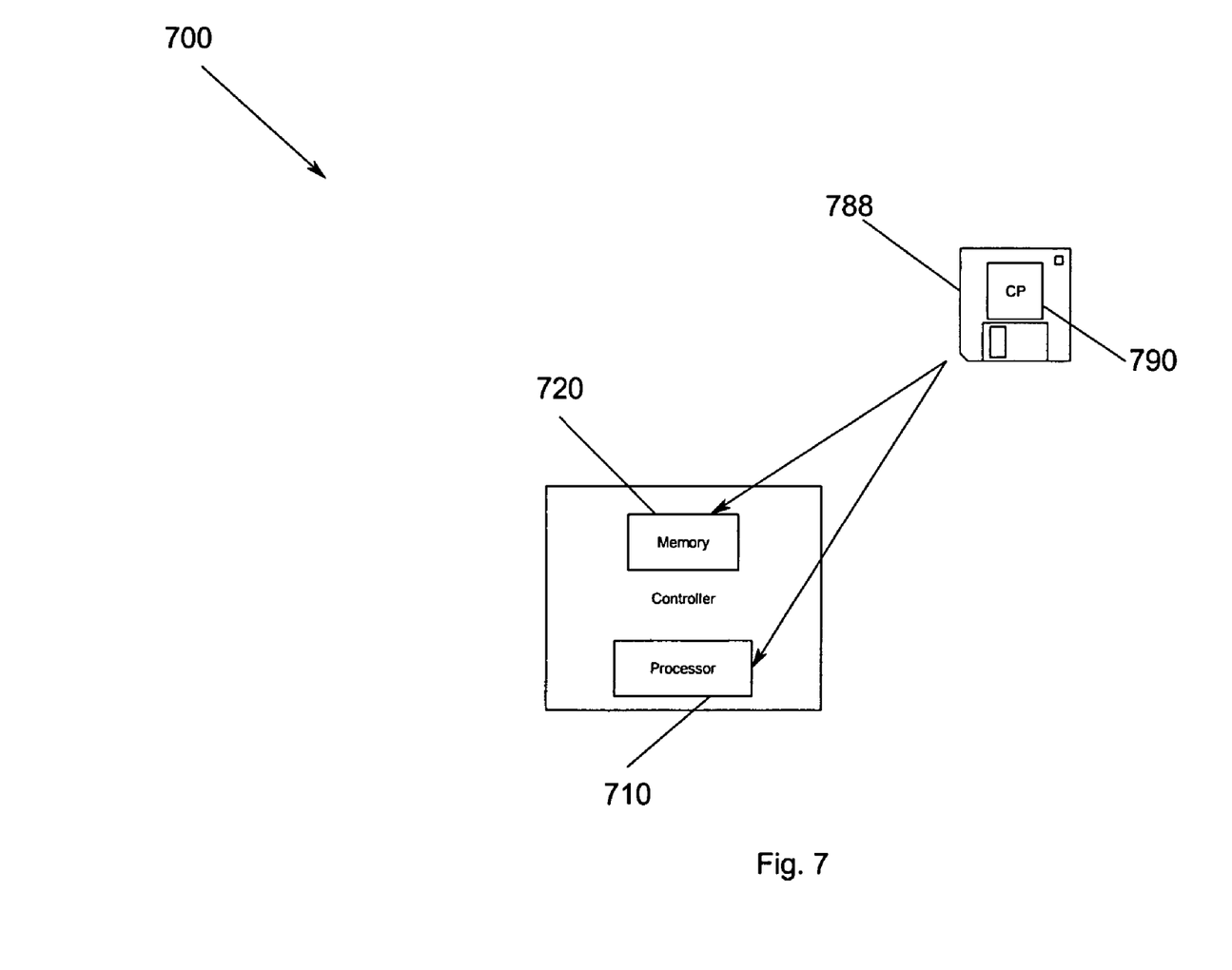
FIG. 7 illustrates a component or system 600 in a high availability storage system according to an embodiment of the present invention.

FIG. 7 illustrates a component or system 700 in a high availability storage system according to an embodiment of the present invention. The system 700 includes a processor 710 and memory 720. The processor controls and processes data for the storage controller 700. The process illustrated with reference to FIGS. 1-6 may be tangibly embodied in a computer-readable medium or carrier, e.g., one or more of the fixed and/or removable data storage devices 788 illustrated in FIG. 7, or other data storage or data communications devices. The computer program 790 may be loaded into memory 720 to configure the processor 710 for execution. The computer program 790 include instructions which, when read and executed by a processor 710 of FIG. 7 causes the processor 710 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing management and control for a storage system, comprising:
   providing a first virtual storage representation, in a secondary virtualization layer within the storage system, the first virtual storage representation comprising a first set of data stored in a first physical disk set;
   implementing a first virtual disk, in a primary virtualization layer within the storage system, using the first virtual storage representation;
   providing a second virtual storage representation in the secondary virtualization layer, the second virtual storage representation comprising a second set of data stored in a second physical disk set, the first or the second physical disk set including a plurality of physical disks;
   implementing a second virtual disk, in the primary virtualization layer, using the second virtual storage representation;
   causing, by a controller in the storage system, the first and second virtual disks to mirror each other, the first and second virtual disks thereby forming a mirrored pair;
   causing the first virtual disk to receive all input and output requests directed to the mirrored pair from hosts external to the storage system;
   performing a swap, after which the second virtual storage representation implements the first virtual disk; and
   servicing, by the first virtual disk, a plurality of input and output requests, from hosts external to the storage system, both before and after performing the swap.

2. The method of claim 1, wherein the swap is done without disrupting servicing, by the mirrored pair, of input and output requests.

3. The method of claim 1, wherein the virtual disks in the primary virtualization layer are implemented by the storage representations in the secondary virtualization layer using SANlinks.

4. The method of claim 1, wherein each of the first and second virtual storage representations is separately fully redundant.

5. The method of claim 1 further comprising rebuilding the second virtual disk.

6. The method of claim 1, further comprising detecting a failure in at least one of the second physical disk set and automatically pausing mirroring until all drives in the second physical disk set become operable.

7. The method of claim 1, wherein the first virtual storage representation includes a RAID.

8. The method of claim 1, wherein the first virtual storage representation is structured differently from the second virtual storage representation.

9. The method of claim 1, wherein the first physical disk set is geographically remote from the second physical disk set.

10. The method of claim 1, further comprising:
    detecting failure of at least one physical disk of the first physical disk set.

11. The method of claim 1, wherein the first and second sets of data remain in place on their respective physical disk sets throughout the swap.

12. The method of claim 1, wherein the first physical disk set and the second physical disk set each comprise a respective plurality of physical disks.

13. The method of claim 1, wherein the first physical disk set comprises a number of disks that is different from the number of disks comprised by the second physical disk set.

14. The method of claim 1, wherein the first physical disk set and the second physical disk set have no disks in common.

15. A storage system, comprising:
    a first virtual storage representation, in a secondary virtualization layer within the storage system, the first virtual storage representation comprising a first set of data stored in a first physical disk set;
    a second virtual storage representation in the secondary virtualization layer, the second virtual storage representation comprising a second set of data stored in a second physical disk set, the first or the second physical disk set including a plurality of physical disks; and
    a controller that
        implements a first virtual disk, in a primary virtualization layer within the storage system, using the first virtual storage representation, implements a second virtual disk, in the primary virtualization layer, using the second virtual storage representation, causes the first and second virtual disks to mirror each other, the first and second virtual disks thereby forming a mirrored pair, causes the first virtual disk to receive all input and output requests directed to the mirrored pair from hosts external to the storage system, performs a swap, after which the second virtual storage representation implements the first virtual disk, and causes the first virtual disk to service a plurality of input and output requests, received from hosts external to the storage system, both before and after the swap.

16. The storage system of claim 15, wherein the controller performs the swap without disrupting servicing, by the mirrored pair, of input and output requests.

17. The storage system of claim 15, wherein the virtual disks in the primary virtualization layer are implemented by the storage representations in the secondary virtualization layer using SANlinks.

18. The storage system of claim 15, wherein the controller ensures that each of the first and second virtual storage representations is separately fully redundant.

19. The storage system of claim 15, wherein the controller rebuilds the second virtual disk.

20. The storage system of claim 15, the controller automatically pausing mirroring until all drives in the second physical disk set become operable, when the controller detects failure in at least one of the second physical disk set.

21. The storage system of claim 15 wherein the first virtual storage representation includes a RAID.

22. The storage system of claim 15, wherein the first virtual storage representation is structured differently from the second virtual storage representation.

23. The storage system of claim 15, wherein the first physical disk set is geographically remote from the second physical disk set.

24. The storage system of claim 15, wherein the controller is further adapted to detect failure of at least one physical disk of the first physical disk set.

25. The storage system of claim 15, wherein the first and second sets of data remain in place on their respective physical disk sets throughout the swap.

26. The storage system of claim 15, wherein the first physical disk set and the second physical disk set each comprise a respective plurality of physical disks.

27. The storage system of claim 15, wherein the first physical disk set comprises a number of disks that is different from the number of disks comprised by the second physical disk set.

28. The storage system of claim 15, wherein the first physical disk set and the second physical disk set have no disks in common.

29. A non-transitory program storage device, comprising:
program instructions executable by a processing device within a storage system to perform operations for providing closed-loop management and control for the storage system, the operations comprising:
providing a first virtual storage representation, in a secondary virtualization layer within the storage system, the first virtual storage representation comprising a first set of data stored in a first physical disk set;
implementing a first virtual disk, in a primary virtualization layer within the storage system, using the first virtual storage representation;
providing a second virtual storage representation in the secondary virtualization layer, the second virtual storage representation comprising a second set of data stored in a second physical disk set, the first or the second physical disk set including a plurality of physical disks;
implementing a second virtual disk, in the primary virtualization layer, using the second virtual storage representation;
causing, by a controller in the storage system, the first and second virtual disks to mirror each other, the first and second virtual disks thereby forming a mirrored pair;
causing the first virtual disk to receive all input and output requests directed to the mirrored pair from hosts external to the storage system;
performing a swap, after which the second virtual storage representation implements the first virtual disk; and
servicing, by the first virtual disk, a plurality of input and output requests, from hosts external to the storage system, both before and after performing the swap.

30. The program storage device of claim 29, wherein the swap is done without disrupting servicing by the mirrored pair of input and output requests.

31. The program storage device of claim 29, wherein the virtual disks in the primary virtualization layer are implemented by the storage representations in the secondary virtualization layer using SANlinks.

32. The program storage device of claim 29, wherein each of the first and second virtual storage representations is separately fully redundant.

33. The program storage device of claim 29, the operations further comprising rebuilding the second virtual disk.

34. The program storage device of claim 29, the operations further comprising detecting a failure in at least one of the second physical disk set and automatically pausing mirroring until all drives in the second physical disk set become operable.

35. The program storage device of claim 29, wherein the first virtual storage representation includes a RAID.

36. The program storage device of claim 29, wherein the first virtual storage representation is structured differently from the second virtual storage representation.

37. The program storage device of claim 29, wherein the first physical disk set is geographically remote from the second physical disk set.

38. The program storage device of claim 29, the operations further comprising:
detecting failure of at least one physical disk of the first physical disk set.

39. The program storage device of claim 29, wherein the first and second sets of data remain in place on their respective physical disk sets throughout the swap.

40. The program storage device of claim 29, wherein the first physical disk set and the second physical disk set each comprise a respective plurality of physical disks.

41. The program storage device of claim 29, wherein the first physical disk set comprises a number of disks that is different from the number of disks comprised by the second physical disk set.

42. The program storage device of claim 29, wherein the first physical disk set and the second physical disk set have no disks in common.

* * * * *